June 23, 1925.  1,543,150
C. W. CARLSON ET AL
DIRIGIBLE HEADLIGHT
Filed Sept. 21, 1923
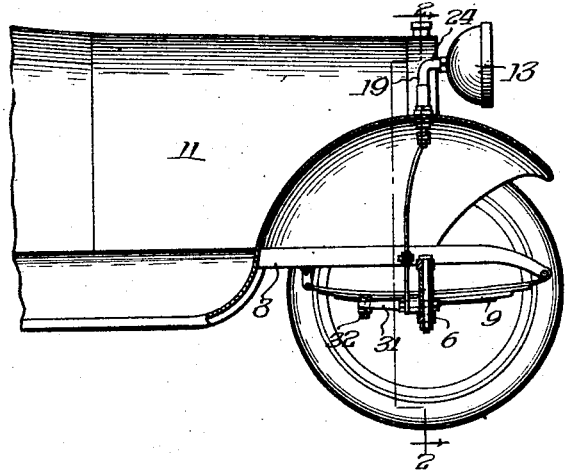
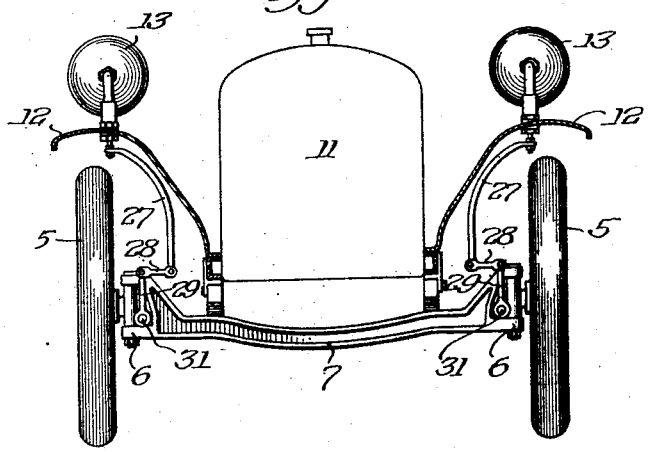
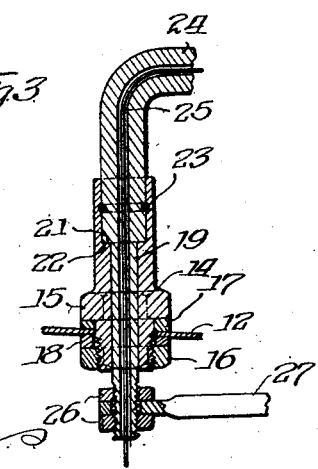
Inventors:
Walter P. Davis
Charles W. Carlson Patented June 23, 1925.

1,543,150

UNITED STATES PATENT OFFICE.

CHARLES W. CARLSON AND WALTER P. DAVIS, OF CHICAGO HEIGHTS, ILLINOIS.

DIRIGIBLE HEADLIGHT.

Application filed September 21, 1923. Serial No. 664,009.

*To all whom it may concern:*

Be it known that we, CHARLES W. CARLSON and WALTER P. DAVIS, citizens of the United States, residing in the city of Chicago Heights, in the county of Cook and State of Illinois, have invented certain new and useful Improvements in Dirigible Headlights, of which the following is a specification.

This invention pertains to headlights for use on automobiles and similar vehicles, and has more particular reference to the mounting of such headlights and to the mechanism by which the headlights are turned upon actuation of the steering gear so that the light will be projected in the direction in which the vehicle is traveling, and will swing laterally with lateral turning movement of the front wheels.

One of the primary purposes of this invention is to provide an improved mounting for headlights of this character, which will enable the headlights to be adjusted and set at the required inclination, and which will permit the headlights to swing in arcs about substantially vertical axes so as to throw the light beams in the desired direction.

Another object is to provide mechanism for turning the lights, which mechanism is operable from the steering gear, and includes a flexible connection permitting vertical movements of the lights relatively to the steering gear as the car chassis moves up and down upon its spring suspension.

Other objects and advantages of our invention should be readily appreciated as the same becomes better understood by reference to the following description, when considered in connection with the accompanying drawings.

Referring to the drawings:

Fig. 1 is a fragmentary side elevation of an automobile equipped with our invention, one of the fenders being shown in section;

Fig. 2 is a sectional view substantially on the line 2—2 of Fig. 1; and

Fig. 3 is a vertical section through one of the headlight mountings.

Referring to the drawings more in detail, reference characters 5 indicate the front wheels of an automobile mounted through the usual steering knuckles 6 upon the ends of the axle 7, from which the chassis 8 is suspended upon the springs 9. The body of the car is indicated generally by reference character 11, and the front fenders by reference characters 12.

For purposes of convenience, we have shown the headlights, which are indicated generally by reference characters 13, as mounted upon the fenders 12, and the details of one of the mountings are best illustrated in Fig. 3. Referring to this figure, it will be observed that the fender is provided with an opening adapted to receive the lower end of a hollow standard 14. This standard is provided with a shoulder 15 above the fender, and is threaded at its lower end to receive a lock nut 16. Between the shoulder 15 and the upper face of the fender there is disposed a tapered washer 17, and between the lower face of the fender and the lock nut 16 there is disposed a similar tapered washer 18. In mounting the standard upon the fender, these washers may be turned so as to dispose the standard in any desired inclination relatively to the fender, to thereby cause the light beam emanating from the headlight to strike the road at any desired distance in front of the car. The inclination of the standard may be adjusted at any time by simply loosening the lock nut 16 and turning the tapered washers so as to vary the inclination of the standard.

Within the standard there is rotatably mounted a hollow post 19, the shoulder 21 of which seats upon a supporting shoulder 22 formed in the standard. The split ring 23 seated in opposed grooves formed upon the exterior of the post 19 and the interior of the standard 14, detachably locks the post against vertical displacement. The post is therefore free to rotate within the standard, but is held against longitudinal displacement therefrom. The upper end of each post is extended horizontally, as indicated at 24, and carries at its extremity a headlight 13. The light wire 25 is led from the light through the hollow post and from the lower end of the post leads to the battery or fuse board in the usual manner.

The lower end of the post 19, which projects beneath the standard 14, is threaded, as shown in Fig. 3, and to this end there is rigidly secured by lock nuts 26, the upper end of an operating lever 27. This lever extends laterally and downwardly from the post, and at its lower end is pivotally connected to a link 28, which in turn is pivotally connected with a post or lug 29, clamped or otherwise rigidly secured to the steering arm 31 of the steering gear. The two steering arms 31 are connected by the drag rod 32 in the usual manner, by which the two wheels are maintained in parallelism during their turning movements.

It will be obvious that as the wheels are turned to steer the car, the posts 29 will be carried with the arms 31, and through the links 28 the levers 27 will be swung about the axes of the posts 19, to thereby oscillate these posts in their standards, and consequently swing the headlights in parallelism and parallel with the front wheels 5. When, therefore, the car is traveling in a straight line, the light beams will be thrown directly ahead, but when the wheels are angled, to turn the car in one direction or the other, both headlights will be simultaneously angled in the same direction, thus projecting the light rays in the direction of travel of the car, so that the terrane, over which the car is about to travel can at all times be observed by the driver.

It is believed that the construction, operation, and many of the inherent advantages of this invention will be understood from the foregoing without further description, and obviously the details of construction may be varied within considerable limits without departing from the essence of the invention, as defined in the following claim.

We claim:

A headlight mounting for vehicles comprising a hollow standard having a downwardly facing shoulder on its exterior and a threaded portion adjacent thereto adapted to be projected through a portion of the vehicle, an upwardly facing shoulder and a groove formed on the interior of said standard, a lamp supporting post adapted to fit within said standard having a shoulder and a groove adapted to cooperate with the groove and shoulder formed within said standard, and a spring ring adapted to engage both of said grooves.

CHARLES W. CARLSON.
WALTER P. DAVIS.